United States Patent [19]

Kindem et al.

[11] Patent Number: 4,913,080
[45] Date of Patent: Apr. 3, 1990

[54] METHOD FOR PRODUCTION AND LAYING A PIPELINE OR A CABLE UNDER WATER

[75] Inventors: Bjørn Kindem, Fredrikstad; Harry Albertsen, Oslo; Ragnar Bognaes, Moss, all of Norway

[73] Assignee: Kverner Subsea Contracting A/S, Lysaker, Norway

[21] Appl. No.: 219,085

[22] Filed: Jul. 14, 1988

[30] Foreign Application Priority Data

Jul. 27, 1987 [NO] Norway ................................. 873135

[51] Int. Cl.$^4$ ............................................. B63B 35/02
[52] U.S. Cl. ..................... 114/258; 114/244; 405/166; 414/139.4; 414/140.6
[58] Field of Search ............ 14/71.3, 71.5, 71.7; 242/78.7, 68.7; 405/154, 158, 166, 156; 414/139.4, 139.8, 140.6; 114/242, 244, 258–260

[56] References Cited

U.S. PATENT DOCUMENTS

| | | | |
|---|---|---|---|
| 2,699,321 | 1/1955 | Nelson | 114/260 X |
| 3,740,957 | 6/1973 | McKenzie | 414/139.8 X |
| 3,822,559 | 7/1974 | Matthews, Jr. | 405/166 |
| 4,080,920 | 3/1978 | Berthet et al. | 114/244 |
| 4,176,801 | 12/1979 | Douglas | 242/68.7 X |
| 4,721,410 | 1/1988 | Recable | 405/166 |

Primary Examiner—Sherman D. Basinger
Attorney, Agent, or Firm—Merchant, Gould, Smith, Edell, Welter & Schmidt

[57] ABSTRACT

The invention relates to a method in production and laying a pipeline or a cable under water, comprising production of the pipeline/cable in a desired length, winding it onto a drum, transporting the drum and laying ramp on board a vessel and laying from the drum while the vessel is moving. Winding onto drum (9) is carried out with the drum being mounted in and carried by a drum carrier (10) on land. At a desired time the drum with wound pipeline is taken on board the vessel (13) by sliding drum carrier (10) on a pier (12) or the like, which in the horizontal plane has an overlapping positional cooperation with the correctly ballasted vessel (13,14) to a position in which drum carrier (10) can be taken over by the vessel (13) by a vertical relative movement between drum carrier (10) and a supporting structure for it on the vessel. Drum carrier (10) can then, if desired, be slid onto a supporting structure (15) to a desired position on the vessel and be made fast there. A vessel for carrying out the method is also disclosed. And a new ramp unit (26) for use in winding off a pipeline or a cable from or onto the drum is also disclosed.

12 Claims, 11 Drawing Sheets

METHOD FOR PRODUCTION AND LAYING A PIPELINE OR A CABLE UNDER WATER

FIELD OF THE INVENTION

The invention relates to a method for producing and laying a pipeline or a cable under water, comprising production of the pipeline/cable in a desired length on land, winding on a drum, transport of the drum, and a laying ramp on a vessel, and laying from the drum while the vessel is moving.

BACKGROUND OF THE INVENTION

The pipeline may be a single pipe or a "pipeline cable", consisting of a number of pipes extending inscrew lines in the cable. It may also comprise conduits and cables in a composite cable.

If it is desirable to be able to lay finished pipelines over long distances it is necessary to allow for a longer production time for the pipeline and considerable dimensions of the drum must be expected with a weight of drum and pipeline in the order of 5000 tons or more.

Pipe laying from a drum is at present carried out by the aid of special vessels, smaller pipelines are sometimes laid by the aid of equipment in component packs which are placed on board a lay vessel when required, so that the vessel can be utilized for other tasks when no pipes are to be laid. Larger and longer pipelines require vessels with permanently mounted laying equipment and a drum, which means that the vessel is out of commission while the pipeline is manufactured on land.

SUMMARY OF THE INVENTION

It is an object of the present invention to provide a method as mentioned above, which permits optimal utilization of production plant and lay vessel. According to the invention it is proposed to wind the pipeline onto the drum with the drum being mounted on and carried by a drum carrier on land, and that the drum with a conduit wound on it is, at a desired time, loaded in the vessel by sliding the drum carrier on a pier or the like which in the horizontal plane has overlapping positional cooperation with the vessel, to a position in which the drum carrier can be taken over by the vessel by a vertical relative movement between the drum carrier and a support member for the latter on the vessel. If desired, the drum carrier can then be further displaced by sliding while resting on the support member to a desired position in the ship to be locked there.

The drum carrier and laying ramp may suitably be slided on board at the same time.

The vertical relative movement can suitably be brought about by de-ballasting the vessel. In this manner the advantage is achieved that the support member may be designed as a permanent member of the vessel. In ballasting/de-ballasting the vessel differences of water level can readily be taken into consideration (level of pier).

The support of the drum carrier in the vessel may suitably be a slide between the location of transfer and the desired location of the drum carrier. The slide may, furthermore, advantageously be a slipway which is inclined towards the desired location of the drum carrier. The advantages of a slide will be obvious, since the drum carrier can slide directly on it to the desired position.

The vessel used may advantageously be provided with a divided afterbody in such a manner that a vertically through opening is formed from the stern which is adapted to the width of the pier. When a drum with wound up conduit is to be taken on board the vessel is placed with the pier projecting into the stern opening, so that a positional cooperation overlapping in the horizontal plane is achieved between pier and vessel. The drum carrier is moved out onto the pier, unless it is already placed there, and is then transferred to the vessel by said relative movement in the vertical direction between drum carrier and the support on the vessel.

With a transfer as mentioned the advantage is achieved that the whole weight of the drum is received evenly distributed on the support means of the vessel, whereas in normal sliding there will be gradual transfer of the weight. With the order of weight in question transfer by common sliding will involve considerable problems which will be well known to those skilled in the Art.

The invention also relates to a vessel for use in subsea laying of a conduit wound on a drum that is placed in a vessel with conduit being unwound from the drum at the same time as the vessel moves. The vessel is characterized by a vertical through opening in the afterbody of the vessel from its stern, and by a slide provided along the longitudinal sides of the opening, which slide extend forward to the area where the drum is located on the vessel. Such a vessel may be utilized with a pier or the like the width of which corresponds to the width of the stern opening, so that vessel and pier may be mutually adapted and the drum with a conduit wound on it can be taken on board as mentioned above. The vessel may be provided with equipment and facilities to render the vessel suitable for other tasks when it is not engaged in pipe laying, so that optimal utilization of the vessel is achieved.

The slides may, advantageously be inclined down to the area where the drum is placed on board. Vertical lowering of the drum to a final level may also be of interest.

The invention, furthermore, relates to a base on land for production of a conduit that is wound on a drum which is mounted in and carried by a drum carrier. The land base is characterized by a pier or the like with a slide for a drum carrier extending in the longitudinal direction of the pier, said pier having a width designed for co-adaptation in a vertically through stern opening in a vessel designed for receiving the drum carrier. The slide may advantageously be inclined in the direction of the pier.

The invention also relates to a unique design of a drum carrier and drum, characterized by the fact that the drum at each end is provided with a large circular shoulder resting in arcuate cradles of the main carrier.

Furthermore, the invention relates to a unique ramp means for laying, if desired, for winding up a conduit or a cable on a drum. The ram means is especially developed in connection with the novel method and the novel vessel, but it is also of independent inventive value.

The ramp means comprises a ramp the foot of which is mounted to be pivotal about a horizontal axis. Said ramp is intended for carrying a conduit/cable during winding or unwinding of the same and its upper portion is supported by a pivotally mounted support. The ramp means according to the invention is characterized by the fact that it is constructed with a basis provided with rails for beraring housings, and with driving mechanisms for the respective bearing housings for displacing the latter along the respective rails, the foot of said ramp being pivotally mounted in a bridge member about an axis orthogonal to the supporting surface on the ramp for the conduit/cable, said bridge member being mounted to be pivotal about a horizontal axis in two opposed bearing housings which are slidably provided on the supporting rails, and said support being in its lowermost area mounted to be pivotal about a horizontal axis in two further opposed bearing housings, and the ramp means is, furthermore, characterized by the fact that the support carries a curved slide the center of curvature of which is located in said pivotal ramp-axis orthogonal to the supporting surface of the ramp, said ramp being supported on said slide by the aid of suitable slide shoes, and a driving means for moving the ramp along the slide being provided between ramp and slide.

Such a ramp means is special because of its simple structure. The unit can readily be transported as a whole, e.g. by the aid of a crane, or by sliding on a suitable support, which is very important in case of sliding on the above mentioned vessel, and the inclination of the ramp can be adjusted as required at the same time as the ramp itself may be displaced in relation to its support, which will simplify adjustment of the ramp, e.g. for laying a pipeline.

Further features of the ramp will appear from the claims.

BRIEF DESCRIPTION OF THE DRAWINGS

The invention is disclosed in more detail below with reference to the drawing, in which.

DETAILED DESCRIPTION OF THE PREFERRED EMBODIMENTS

Figure 1:
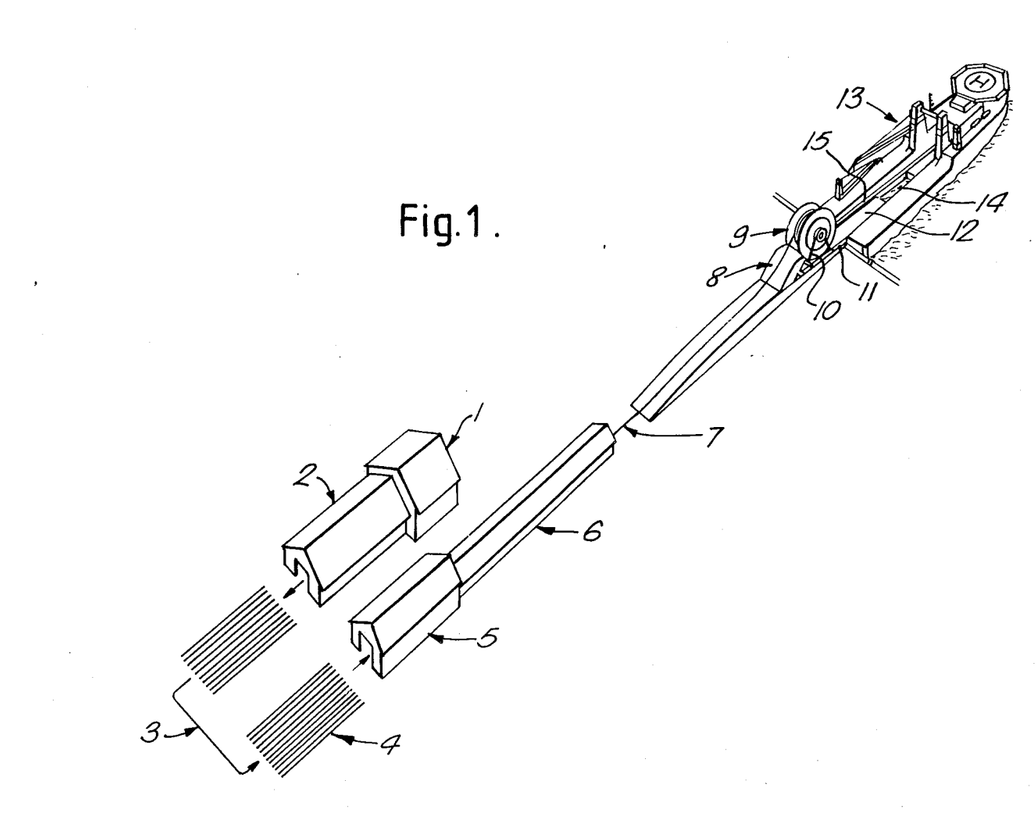
FIG. 1 is a diagrammatical view of the production plant for a piepline for subsea laying, which is wound onto a drum and is then transferred to a lay vessel.

FIGS. 1 shows a land based plant according to the invention. At 1 standard pipe lengths are supplied to a shed and proceed to a shed 2 where pipe sections are completed. Said pipe sections then proceed for control and hydro-testing at 3 and to an intermediate store 4. In shed 5 the pipe sections are welded together. In shed 6 finishing work is carried out (insulation, sheathing, etc.).

This plant is not only suitable for producing single pipelines but may especially be utilized for production of a so called pipeline cable comprising a number of separate pipelines in a bundle and emerging as a composite member at 7.

At 8 pipeline 7 (comprising a number of helically wound pipelines) passes through a means used for winding the pipeline on a drum 9. Drum 9 is mounted in and carried by a drum carrier 10. Said drum carrier 10 rests on a slide 11 which continues on a pier 12.

Figure 6:
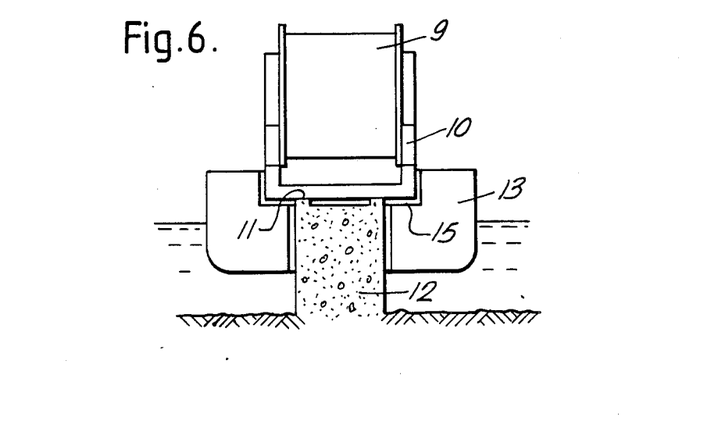
FIG. 6 is a diagrammatical cross section of a pier which is part of the plant according to FIG. 1, with a mutually adapted lay vessel.

A vessel 13 is built with a vertically through stern opening 14 and is backed so as to receive pier 12 in stern opening 14. On board the vessel 13 slides 15 are provided along the sides of said stern opening. In this connection reference is made to FIG. 6 which shows a sectional view of the pier and vessel. It will appear that the vessel 13 is afloat at such a low level in the water that the slides 15 are at a lower level than slides 15 on pier 12. Drum carrier 10 is shown in FIG. 6, and it is assumed that the drum carrier was advanced on slides 11 to a position on the pier in contrast to FIG. 1, where drum carrier 10 is not yet moved onto the pier. In this connection it should be mentioned that a drum complete with wound conduit may be slid laterally for storage, if desired, while a pipeline is wound onto a new drum.

Figure 2:
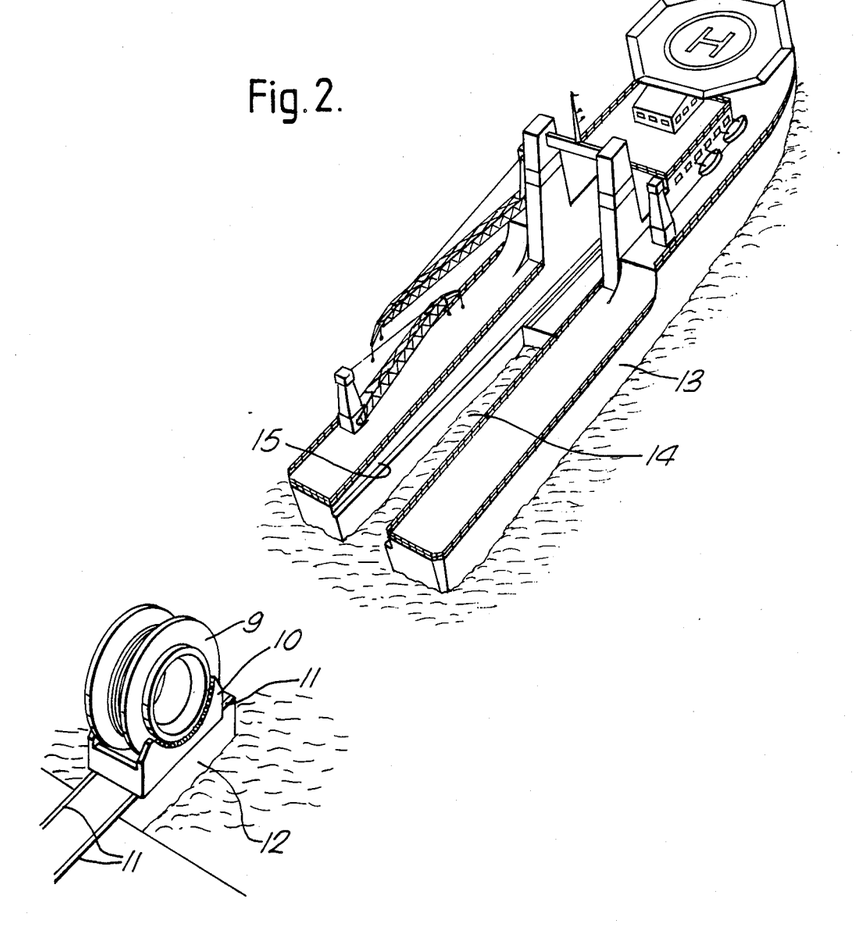
FIGS. 2, 3, 4, and 5 show various steps of transfer of the drum with the pipeline coil according to FIG. 1.
Figure 17:
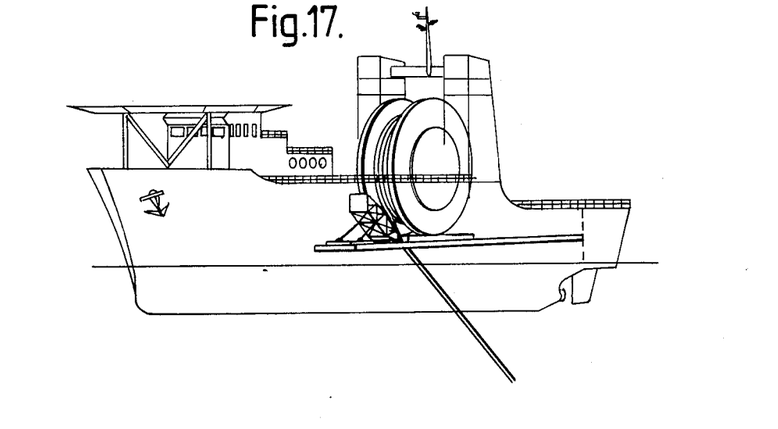
FIG. 17 is a perspective view of how the pipeline may be laid from the underside of the drum, by way of example.

In FIG. 2 vessel 13 is shown backing to pier 12. Vessel 13, as mentioned, has a stern opening which is a vertically through opening, cf. FIG. 5. The length of stern opening 14 forward depends on actual demands. In principle, the stern opening must have a length sufficient to permit it to receive a suitable length of the pier corresponding to the length of drum carrier 10, so that transfer is possible, however, stern opening 14 may extend further, e.g. if it is desirable to lay the pipeline by unwinding it from the side of the drum facing the ship's bow, i.e. from the underside of the drum. This is diagrammatically shown in FIG. 17. For each unwinding the vessel may, obviously, have a separate well in stead of a stern opening enlarged in a forward direction.

Figure 5:
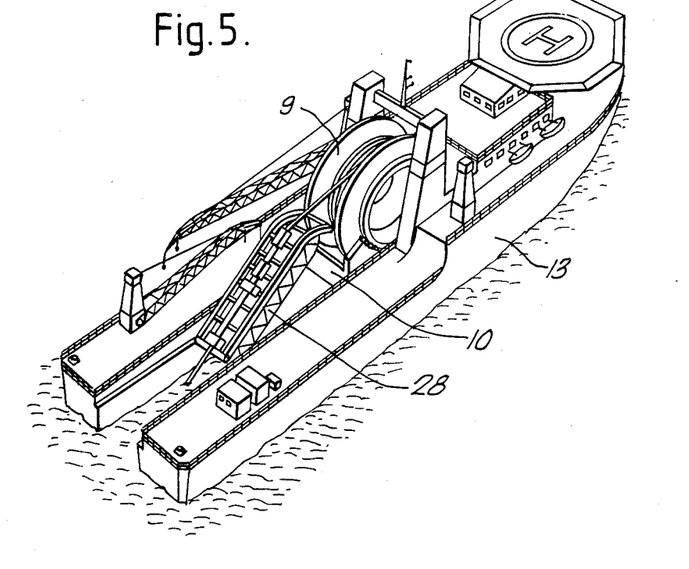

In FIG. 2 only one slide 15 is shown along the port limit of the stern opening 14, but a corresponding slide is, obviously, provided along the starboard side of the stern opening, cf. FIG. 5. Slides 15 slope forward and downward, as shown.

Figure 3:
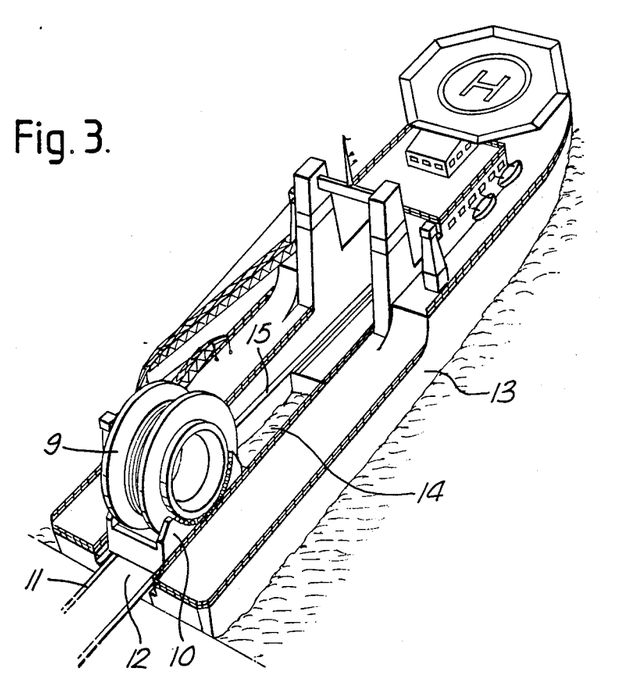

In FIG. 3 vessel 13 is backed in place with pier 12 inside stern opening 14. Drum carrier 10 still stands on the pier in FIG. 3.

Figure 4:
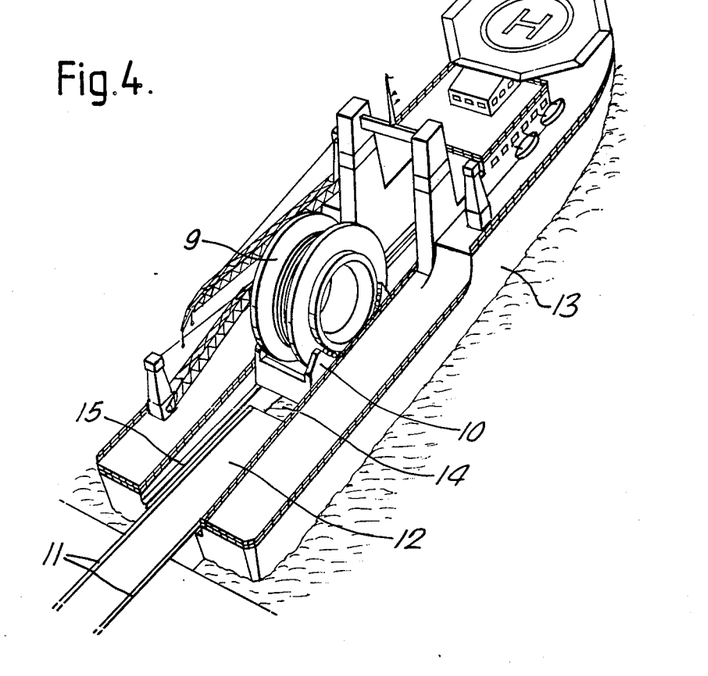

In FIG. 4 the drum carrier with drum is shown transferred to the vessel. This was carried out by sliding drum carrier 10 with drum 9 outwards on pier 12, then de-ballasting vessel 13 so that the afterbody is elevated and takes over the weight of drum carrier 10 and drum 9 with drum carrier 10 now resting on slides 15 on the vessel. Drum carrier 10 may slide on slides 15 to its desired location, in the shown case approximately midships, as shown in FIG. 5. The drum carrier is then made fast in a suitable manner on the vessel.

Figure 7:
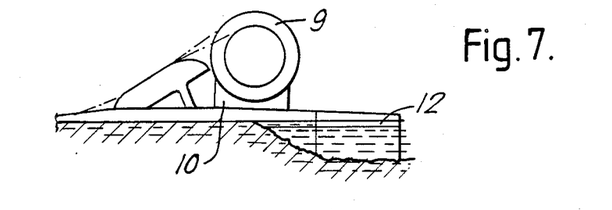
FIGS. 7 and 8 show a side elevation, and a plan view, respectively, of a pier which is part of the plant according to FIG. 1, with an associated drum and drum carrier.
Figure 8:
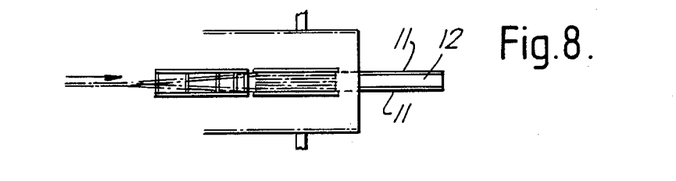

The method used for transferring the drum carrier with the drum and wound-up pipeline is shown in more detail in FIGS. 7–12 and will be disclosed below with reference to the mentioned Figures as well as FIG. 6. In FIGS. 7 and 8 drum 9 is shown during the final wind-up phase. Drum 9 is carried by a drum carrier 10, as mentioned above. A pier juts out from the quay. Slides 11 are provided on the pier for drum carrier 10.

Figure 9:
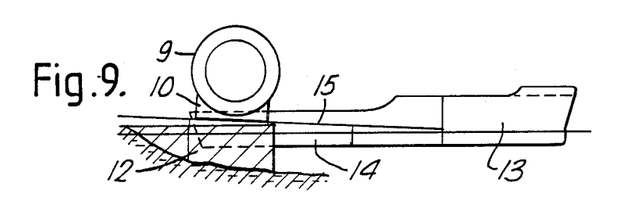
FIGS. 9 and 10 show a side elevation, and a plan view, respectively with a lay vessel backed to cooperation with the pier.
Figure 10:
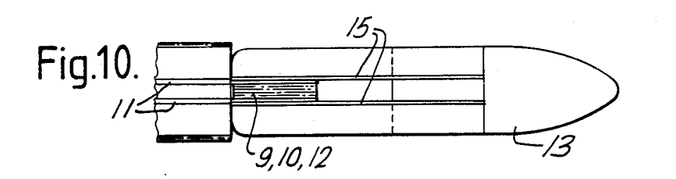
Figure 11:
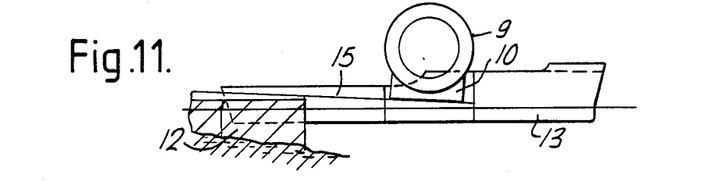
FIGS. 11 and 12 show a side elevation, and a plan view, respectively like FIG. 9 and 10 with the drum carrier and drum transferred to the vessel and placed in a desired location in board.
Figure 12:
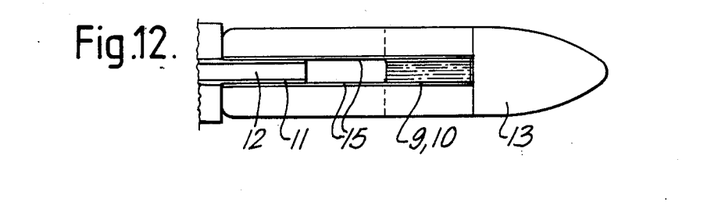

In FIGS. 9 and 10 the vessel 13 is shown backed towards the quay, as mentioned before, with pier 12 in stern opening 14. Drum carrier 10 with drum 9 is slid onto the pier 12, and the situation is as shown in FIG. 6. Now, the vessel may be de-ballasted to lift the sternbody, and slides 15 on the vessel will achieve a carrying cooperation with drum carrier 10. Drum carrier 10 may be slid further on slides 15 on the vessel to its final position, as shown in FIGS. 11 and 12. Drum carrier 10 is then secured in a suitable manner and the vessel is ready to depart.

Figure 13:
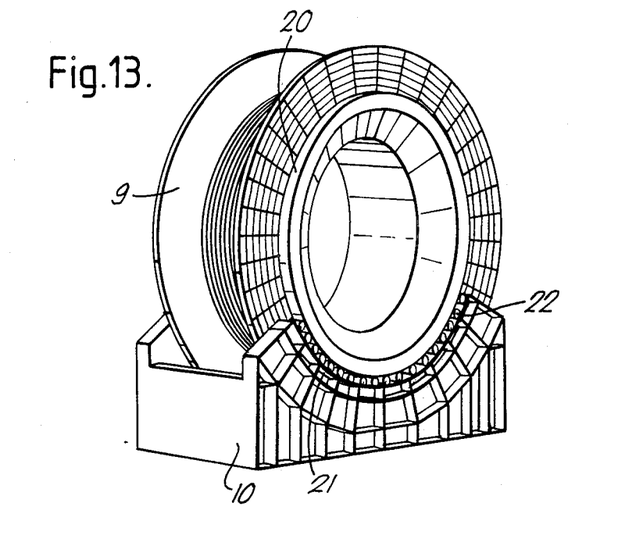
FIG. 13 is a perspective view of a drum carrier with a drum.

As mentioned, the drum carrier and drum have their own inventive value. Drum 9, as shown in FIG. 13, has a large circular shoulder 20 at each end which rests in arcuate cradles 21 in drum carrier 10, in the shown case with rollers 22 provided in between. The drum carrier is a box like structure made from welded steel plates.

Figure 14:
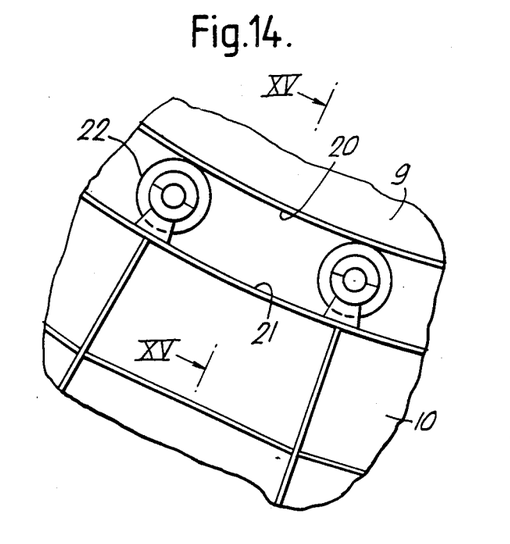
FIG. 14 shows a section of the drum mounting in the carrier.
Figure 15:
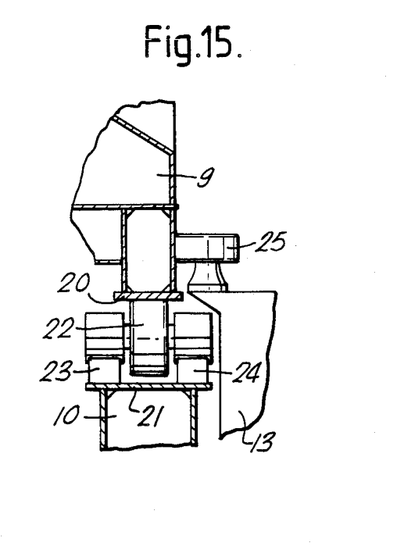
FIG. 15 is a section along line XV—XV in FIG. 4, showing part of the vessel.
Figure 16:
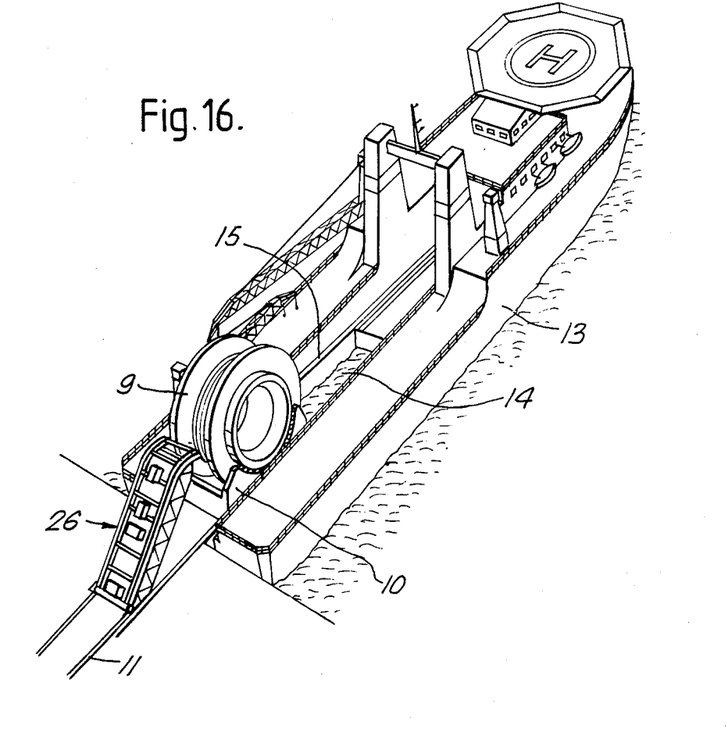
FIG. 16 is a perspective view of the vessel as shown in FIG. 4, with a drum carrier and a lay ramp connected to the carrier.

The support on rollers 22 in cradle 21 is shown in more detail in FIGS. 14 and 15. Each roller 22 is spherically supported in a manner not shown by two bearing blocks 23 and 24 which are mounted on cradle 21. The circular shoulder 20 of drum 9 rests on rollers 22. Instead of rollers, there may obviously be other support means, e.g. slide bearings.

On vessel 13 lateral support rollers 25 are mounted. Rollers 25 safeguard drum 9 in a lateral direction.

Figure 18:
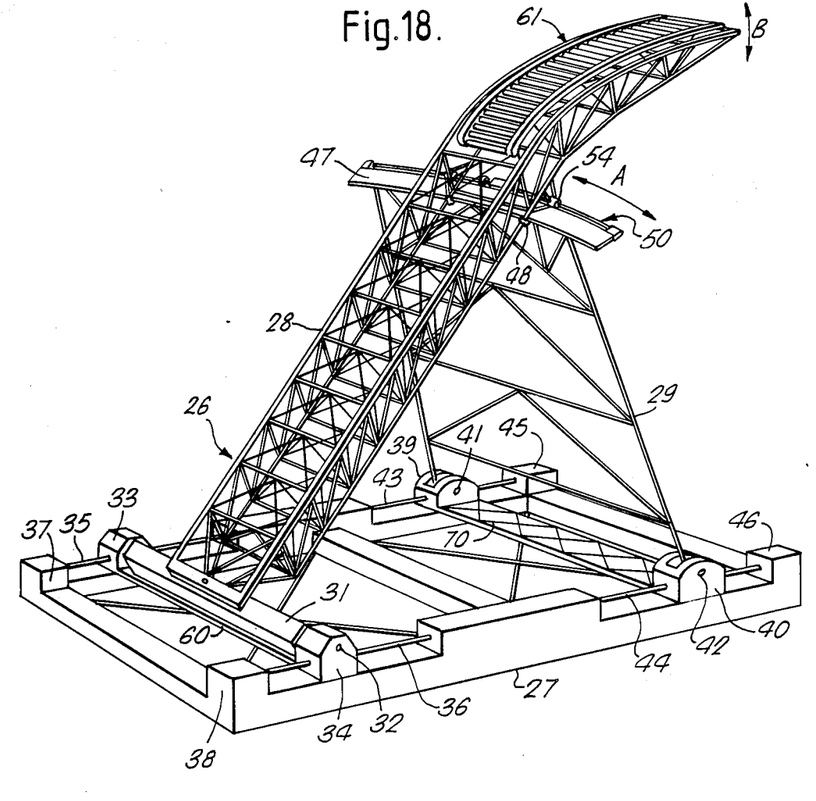
FIG. 18 is a simplified perspective view of the new ramp means according to the invention.

Ramp 26 shown in perspective in FIG. 18 is designed especially for use in connection with the vessel disclosed above, but it may obviously be readily modified to be placed on other vessels. Ramp 26 is built as a displaceable assembly and mainly consists of a supporting frame 27, the ramp proper 28, constructed as a lattice structure, and a support 29 for ramp 28.

The foot of ramp 28 is at 30 pivotally mounted on a box shaped beam 31 with the axis of rotation 30 extending orthogonally on the supporting plane of ramp 28, so that the ramp can also swing as indicated by double arrow A. Box shaped beam 31 is swingably mounted in bearing housings 33, 34, respectively by the aid of sturdy pins 32. The axis of rotation formed by pins 32 is horizontal and extends orthogonally on axis of rotation 30. Ramp 28 may, thus, be turned as indicated by double arrow B.

Each bearing housing 33, 34 is provided with a nut member (not shown) cooperating with a screw spindle 35, and 36, respectively. Each screw spindle 35, 36 is driven by a suitable motor 37, 38. Corresponding bearing housings 39, 40 are provided forward on support 27 where support 39 is mounted by the aid of sturdy bearing pins 41, 42. Each bearing housing contains a nut member not shown, for cooperation with a screw spindle 43 and 44, respectively, driven by a motor 45, 46, respectively.

Figure 19:
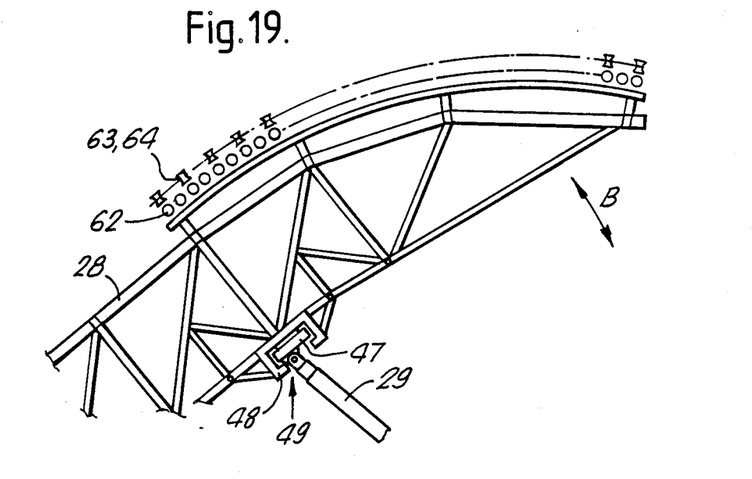
FIG. 19 is an elevation of a section of the upper part of the ramp as shown in FIG. 18.
Figure 20:
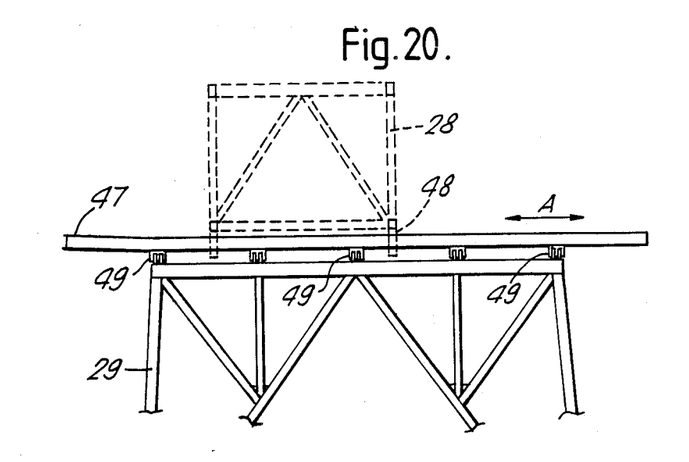
FIG. 20 is a view of a section of the eara where the ramp and its support meet.

Support 29 which is pivotally mounted in bearing housings 39, 40 by the aid of pins 41, 42 extends upwards to supporting cooperation with inclined ramp 28. Uppermost on support 39 a curved slide 47 is provided. The center of curvature of the slide lies in swivel pin 30 of ramp 28. Ramp 28 is slidably supported on slide 47 by the aid of suitable sliding shoes 48 (FIG. 19). Slide 47 is hinged on top of support 29 by the aid of a number of hinge-lugs 49 (cf. also FIG. 20).

Figure 21:
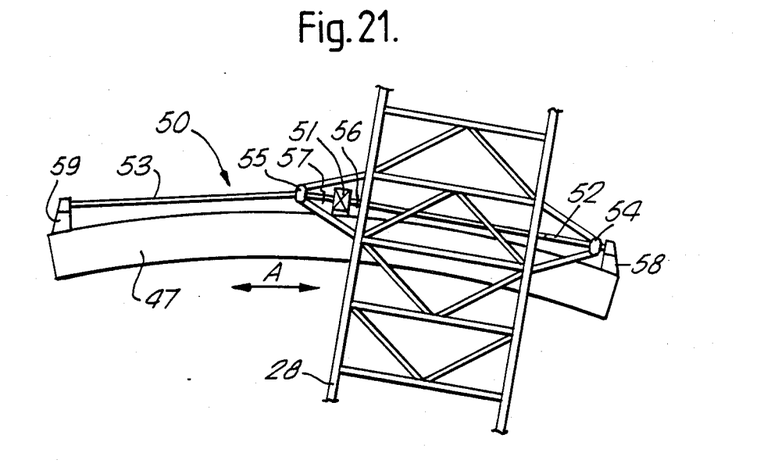
FIG. 21 is a plan view of the same area, as seen from above.

Slide 47 carries a spindle-drive means 50 (FIG. 21). Said spindle-drive means 50 comprises mainly two spindles 52, 53 operated by a motor 51 and each cooperating with a nut member 54, 55 which is mounted on ramp 28. Spindles 52, 53 are driven by motor 51 via suitable universal joints 56, 57. The free ends of screw spindles 52, 53 are pivoted in suitable bearing brackets 58, 59 which are secured to slide 47.

The entire ramp assembly 26 may be displaced separately, e.g. by the aid of a crane, or by sliding the support frame 27 on a suitable foundation. Ramp 28 and its support 29 may be displaced along support 27 by the aid of screw spindles 35, 36, 43, 44. If all spindles are driven in the same direction ramp 28 with support 29 can be displaced as a unit without any change of the angle between ramp 28 and support 29. The inclination of ramp 28 may be changed by operating one of the pairs of spindles 35, 36; 43, 44, or by operating both pairs of spindles with different velocity or in an opposite direction.

Ramp 28 can be turned as indicated by double arrow A by the aid of spindle driving means 50. Such turning movement is desirable to permit ramp 28, i.e. the means provided on the ramp for tensioning and adjusting the conduit, not shown, which is to be laid or wound by the aid of the ramp, to adjust in accordance with the position of the conduit on the drum.

It is desirable that it should be possible to adjust ramp 28 as indicated by double arrow B for adjustment to additional parameters, especially the depth of the sea. After adjustment of the inclination of ramp 28 the ramp may, if desired, be secured to relieve the pressure on the spindle driving means. Securing may be achieved by suitable means, known per se, e.g. sturdy mechanical locks or even by temporary welding of the bearing housings to the support.

In order to avoid torsion the separate bearing housings 33, 34 and 39, 40 are mutually connected by the aid of a lattice bridge 60, and 70, respectively.

Figure 22:
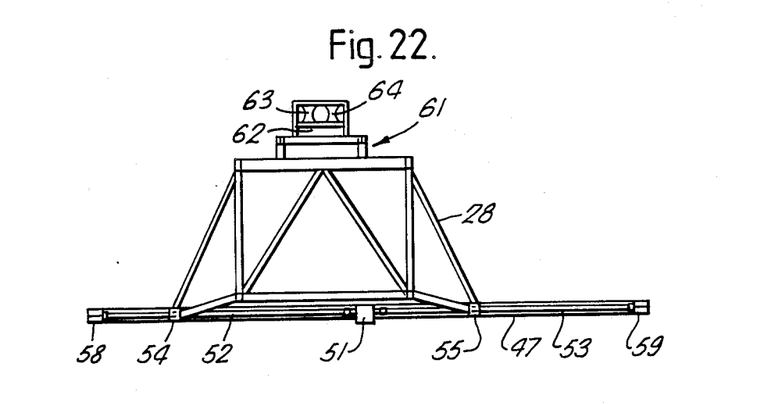
FIG. 22 is a supplementary elevation of said area.

On top of ramp 28, on its curved portion, a roller track 61 is mounted and provided with rollers, not shown, which extend with their axes of rotation in the supporting plane of ramp 28, i.e. in parallel with the axis formed by axis of rotation 32 of box shaped beam 31. Furthermore, the roller track comprises lateral supporting rollers which are provided orthogonally on the ramp. FIG. 22 shows a section through the area of roller track 61, with supporting rollers 62 and lateral supporting rollers 63, 64 for the conduit, not shown, to be laid.

As indicated above, necessary tensioning and adjusting means may be provided on ramp 28. Such equipment is well-known to those skilled in the Art and is, thus, not shown or described here.

We claim:

1. A method for producing a conduit and laying same under water, using a drum mounted on a drum carrier, a pier which leaves a portion of the drum carrier exposed from below when positioned at the end of the pier, a laying ramp, and a vessel having supporting means for carrying the drum carrier and the laying ramp and being capable of adjusting the height of the supporting means relative to the height of the pier, the method comprising the steps of:

(a) transporting a drum on which a conduit is wound and a drum carrier to the end of the pier;
(b) positioning the supporting means beneath an exposed portion of the drum carrier;
(c) raising the height of the supporting means so as to lift the drum and drum carrier off the pier; and
(d) moving the drum and drum carrier to the desired position on the vessel so that the conduit can be dispensed off the drum when the vessel is in motion.

2. A method according to claim 1, wherein said moving step includes the moving of a laying ramp onto the vessel.

3. A method according to claim 1, wherein the ballast of the vessel is adjustable and said positioning and raising steps include adjusting the height of the supporting means by adjusting the ballast of the vessel.

4. A method according to claim 1, wherein the supporting means is a slide track extending to the desired location of the drum carrier on the vessel.

5. A method according to claim 4, wherein the slide track slopes downward toward the desired location of the drum carrier on the vessel.

6. A method according to claim 1, wherein the vessel has a vertically through stern opening, having a width so as to receive the pier within the opening.

7. A land base for transferring a conduit onto a vessel, comprising:

(a) a drum on which a conduit is wound;
(b) carrier means for carrying said drum;
(c) a pier, onto which said carrier means and said drum are placed so as to be in position for pickup by a vessel, wherein said pier is of a width so as to be received in a cooperating opening through the stern of the vessel; and
(d) slide means disposed on said pier and along which said carrier means and said drum may be moved into position on said pier for pickup by a vessel.

8. A land base according to claim 7, wherein said slide means is inclined in the direction of the pier.

9. A ramp unit for use in winding a conduit onto or off of a drum on a vessel, wherein the installation or removal of the ramp and drum is facilitated by a through the stern opening in the vessel, wherein said ramp is capable of being installed on or removed from a vessel as a unit, said ramp comprising:

(a) a frame;
(b) first, second, third, and fourth rails attached to said frame in a substantially horizontal and longitudinal orientation;
(c) first, second, third, and fourth bearing housings, each movably attached to one of said rails;
(d) a first beam member axially and rotatably attached to said first and second bearing housings, so as to allow said first beam member to rotate axially, and to move longitudinally by movement of said first and second bearing housings along said first and second rails;
(e) a second beam member attached to said third and fourth bearing housings, so as to allow said second beam member to move longitudinally by movement of said third and fourth bearing housings along said third and fourth rails;
(f) a ramp support member, pivotally attached to said third and fourth bearing housings, and extending upwards so as to support an inclined ramp;
(g) a curved slide track attached to the top of said ramp support member and along which an inclined ramp may slide;
(h) an inclined ramp slidably attached to said curved slide track and pivotally attached to said first beam member so as to pivot in an axis orthogonal to said ramp;
(i) first driving means for displacing said first and second bearing housings along said first and second rails;
(j) second driving means for displacing said third and fourth bearing housings along said third and fourth rails; and
(k) third driving means for displacing said inclined ramp along said curved slide track.

10. A ramp unit according to claim 9, wherein said third driving means is a screw spindle drive.

11. A ramp unit according to claim 9, wherein said first and second driving means are screw spindle drives.

12. A ramp unit according to claim 9, wherein said curved slide track is attached to said ramp support member by using a hinge.

* * * * *

UNITED STATES PATENT AND TRADEMARK OFFICE
CERTIFICATE OF CORRECTION

PATENT NO. : 4,913,080

DATED : 3 April 1990

INVENTOR(S) : Bjorn Kindem, Harry Albertsen, Ragnar Bognaes

It is certified that error appears in the above-identified patent and that said Letters Patent is hereby corrected as shown below:

Front page, Assignee: "Kverner" should be --Kvaerner--

Abstract, line 20, "off" should be --of--.

Col. 1, line 15, "inscrew" should be --in screw--.

Col. 2, line 26, "extend" should be --extends--.

Col. 2, line 68, "beraing" should be --bearing--.

Col. 3, line 34, "piepline" should be --pipeline--.

Col. 3, line 49, "FIG." should be --FIGS.--.

Col. 4, line 1, "eara" should be --area--.

Col. 4, line 9, "FIGS." should be --FIG.--.

Col. 4, line 55, "in stead" should be --instead--.

Col. 5, line 40, "safequard" should be --safeguard--.

Col. 7, line 2, "dram" should be --drum--.

Signed and Sealed this

Fourth Day of June, 1991

Attest:

HARRY F. MANBECK, JR.

*Attesting Officer*  *Commissioner of Patents and Trademarks*